United States Patent
Lee et al.

(10) Patent No.: US 8,691,455 B2
(45) Date of Patent: Apr. 8, 2014

(54) FUEL CELL SYSTEM AND METHOD OF OPERATING THE SAME

(75) Inventors: Jae-Yong Lee, Yongin-si (KR); Hye-lung Cho, Yongin-si (KR); Young-jae Kim, Yongin-si (KR); Lei Hu, Yongin-si (KR); Young-soo Joung, Yongin-si (KR)

(73) Assignee: Samsung SDI Co., Ltd., Yongin-Si, Gyeonggi-Do (KR)

( * ) Notice: Subject to any disclaimer, the term of this patent is extended or adjusted under 35 U.S.C. 154(b) by 1874 days.

(21) Appl. No.: 11/840,805

(22) Filed: Aug. 17, 2007

(65) Prior Publication Data

US 2008/0044694 A1 Feb. 21, 2008

(30) Foreign Application Priority Data

Aug. 17, 2006 (KR) .................. 10-2006-0077775
May 22, 2007 (KR) .................. 10-2007-0049943

(51) Int. Cl.
 *H01M 8/04* (2006.01)
 *H01M 8/06* (2006.01)

(52) U.S. Cl.
 USPC ........... 429/428; 429/408; 429/432; 429/433; 429/442

(58) Field of Classification Search
 None
 See application file for complete search history.

(56) References Cited

U.S. PATENT DOCUMENTS

| | | | |
|---|---|---|---|
| 6,982,129 B1 | 1/2006 | Bai et al. | |
| 7,157,164 B2 | 1/2007 | Nakanishi et al. | |
| 2002/0122963 A1* | 9/2002 | Buchner et al. | 429/13 |
| 2003/0198845 A1* | 10/2003 | Nakanishi et al. | 429/22 |
| 2004/0224192 A1* | 11/2004 | Pearson | 429/13 |
| 2005/0042492 A1 | 2/2005 | Kato et al. | |
| 2005/0233192 A1* | 10/2005 | Ishikawa et al. | 429/23 |

FOREIGN PATENT DOCUMENTS

| | | |
|---|---|---|
| CN | 1529921 | 9/2004 |
| CN | 1551391 | 12/2004 |
| JP | 10-223248 | 8/1998 |
| JP | 2003-109636 | 4/2003 |
| JP | 2003-115305 | 4/2003 |
| JP | 2003-317770 | 11/2003 |
| JP | 2003-331930 | 11/2003 |
| JP | 2006-156040 | 6/2006 |
| WO | WO 2005/078844 A1 | 8/2005 |

OTHER PUBLICATIONS

Office Action issued in Chinese Patent Application No. 2007101427343 on Apr. 24, 2009.
US 7,282,284 dated Oct. 16, 2007 (English Abstract).
US 2004/0247964 dated Dec. 9, 2004 (English Abstract).
First Office Action issued in Chinese Patent Application No. 2007101427343 on Nov. 7, 2008.
Office Action issued Aug. 28, 2009 in corresponding Chinese Patent Application No. 2007101427343.

* cited by examiner

*Primary Examiner* — Barbara Gilliam
*Assistant Examiner* — Adam A Arciero
(74) *Attorney, Agent, or Firm* — Lee & Morse, P.C.

(57) ABSTRACT

A fuel cell system and a method of operating the same, the fuel cell system comprising: a fuel cell including at least one unit cell; an switch having first and second ends connected to different type electrodes of the fuel cell; and a circuit unit to detect whether a load is applied to the fuel cell, to control the operation of the switch according to the detection, cycle the switch open and closed to short circuit the fuel cell, in order to prevent the fuel cell from overheating and to consume a residual fuel in the fuel cell. The fuel cell system may further include a converter, a secondary cell, a battery charger, and a switching unit between the load and the fuel cell.

24 Claims, 7 Drawing Sheets

FUEL CELL SYSTEM AND METHOD OF OPERATING THE SAME

CROSS-REFERENCE TO RELATED APPLICATIONS

This application claims the benefit of Korean Application Nos. 2006-77775, filed Aug. 17, 2006 and 2007-49943, filed May 22, 2007, in the Korean Intellectual Property Office, the disclosure of which is incorporated herein by reference.

BACKGROUND OF THE INVENTION

1. Field of the Invention

Aspects of the present invention relate to a power supplying device, and more particularly, to a fuel cell system and a method of operating the same.

2. Description of the Related Art

There are many types of fuel cells. Fuel cells can be divided into direct methanol fuel cells (DMFCs), which directly use methanol, and proton exchange membrane fuel cells (PEMFCs).

A DMFC produces power in a process in which electrons and hydrogen ions, generated at an anode of a membrane electrode assembly (MEA), are moved to a cathode of the MEA and react with oxygen. The electrons and hydrogen ions are generated by reaction of methanol supplied from a cartridge and water, at the anode of the MEA. Fuel is continuously supplied from the cartridge to the MEA while the DMFC is operated. Accordingly, when the operation of the DMFC is stopped, or there is no load connected to the DMFC, the fuel is no longer supplied, but residual fuel may remain between the cartridge and the MEA and also on the inside of the MEA.

If the DMFC is a passive fuel cell, it is very difficult to completely remove the residual fuel when the DMFC stops operating, thereby requiring an additional method to remove the residual fuel. If the residual fuel is not removed from the MEA, the MEA is continuously exposed to the residual fuel, such that the MEA, specifically, a filter and electrodes installed in the MEA, may be structurally damaged. In particular, if the fuel is highly concentrated, damage to the MEA may be more severe. Also, when the residual fuel exits from a carbon dioxide ($CO_2$) outlet, such a discharge may violate the safety standards of the International Standardization Organization (ISO).

If the DMFC has an active component, the residual fuel may be removed to some extent using the active component. However, additional power is necessary to operate the active component, and as such, it is difficult to completely remove the residual fuel from the MEA.

Many attempts have been made to solve the problems posed by residual fuel in a DMFC. For example, there is a method of consuming the residual fuel in the DMFC, by connecting an additional load to the DMFC. However, since this method necessarily requires the additional load, the method becomes complex, costly, and time consuming.

SUMMARY OF THE INVENTION

Aspects of the present invention provide a fuel cell system that can safely consume a residual fuel remaining in a fuel cell, by controlling the operation of the fuel cell, without any additional load.

Aspects of the present invention also provide a method of operating the fuel cell system, which can consume residual fuel remaining in the fuel cell.

According to aspects of the present invention, there is provided a fuel cell system to supply power to a load, the fuel cell system comprising: a fuel cell (fuel cell stack) including at least one unit cell; an ON/OFF switch having first and second ends respectively connected to different type electrodes of the fuel cell, and a circuit unit to control the operation of the switch.

According various embodiments, the fuel cell may include a plurality of unit cells that are connected in series. A first end of the switch may be connected to an anode of a first unit cell of the plurality of unit cells, and a second end of the switch may be connected to a cathode of a final unit cell of the plurality of unit cells.

According to some embodiments, plurality of switches may be used. The number of the switches may be equal to the number of the unit cells, and the switches may correspond one-to-one with the unit cells. First and second ends of each switch may be connected to different electrodes of a corresponding unit cell.

According to various embodiments, the number of the switches may be less than the number of unit cells, at least one of the switches may correspond to two of the unit cells, and the remaining switches may have a one-to-one correspondence with the remaining unit cells.

According to some embodiments, the circuit unit may include a controller that opens and closes a switch, by applying a pulse signal to the switch.

According to various embodiments, the fuel cell system may further comprise, in addition to a plurality of switches, one switch having a first end connected to the anode of the first unit cell of the plurality of unit cells, and a second end connected to the cathode of the final unit cell of the plurality of unit cells.

According to some embodiments, the fuel cell system may further comprise a converter, a secondary cell, a battery charger, and a switching unit, between the load and the fuel cell.

According to other aspects of the present invention, there is provided a method of operating a fuel cell system, comprising the fuel cell including at least one unit cell to supply power to a load, and a switch connected to the fuel cell, which is open when the fuel cell is operated normally. The switch can be closed to complete a short circuit, to consume a residual fuel remaining in the fuel cell, when the operation of the fuel cell is stopped, or when there is no load connected to the fuel cell. The method comprises: maintaining the switch in a closed state for a first time; maintaining the switch in an open state for a second time; and repeating the above operation. The first time is shorter than the second time.

According to various embodiments, the fuel cell may include a plurality of unit cells that are connected in series.

According to various embodiments, the first end of the switch may be connected to an anode of a first unit cell of the plurality of unit cells, and the second end of the switch may be connected to a cathode of a final unit cell of the plurality of unit cells.

According to some embodiments, in the repeating of the above operation, the second time in at least one operational cycle may be shorter than the second time in a preceding and subsequent operational cycle.

According to various embodiments, two or more switches may be provided. The number of the switches may correspond one-to-one with the number of the unit cells, and first and second ends of each switch may be connected to different electrodes of a corresponding unit cell. The fuel cell system may further comprise one switch having a first end connected to an anode of a first unit cell of the plurality of unit cells, and a second end connected to a cathode of a final unit cell of the plurality of unit cells.

According to some embodiments, the plurality of switches may be simultaneously or sequentially opened and closed.

According to various embodiments, when the plurality of switches are sequentially opened and closed, the method may further comprise: dividing the plurality of switches into a plurality of switch groups; and opening and closing the plurality of switches in the switch groups sequentially, at time intervals.

According to various embodiments, the switches included in one of the plurality of switch groups may be simultaneously or sequentially opened and closed.

According to some embodiments, a voltage of each of the unit cells measured when the switch is maintained in a open state for the second time is used as a preset reference voltage, and the maintaining of the switch in a closed state for the first time may be stopped.

According to various embodiments, the number of the switches may be less than the number of the plurality of unit cells, at least one of the switches may corresponds to at least two of the unit cells, and the remaining switches may correspond to the remaining unit cells in a one-to-one basis.

According to various embodiments, the fuel cell system may further comprise an additional switch having a first end connected to the anode of the first unit cell of the plurality of unit cells, and a second end connected to the cathode of the final unit cell of the plurality of unit cells. When either the plurality of switches or the additional switch is opened, the remaining switches may be repeatedly opened and closed. The plurality of switches may be sequentially opened and closed.

According to some embodiments, the fuel cell may have a mono-polar structure or a stack structure.

According to various embodiments, when the first time is t and the second time is T, a ratio of the first time t to the second time T (t/T) may be greater than zero (0) and equal to or less than 0.7 ($0<(t/T)\leq0.7$).

According to various embodiments, the fuel cell system may further comprise a converter, a secondary cell, a battery charger, and a switching unit between the load and the fuel cell. In this case, the method may further comprise fully charging the secondary cell, before the closing the switch for the first time, the maintaining of the switch in an open state for the second time, and the repeating of the above operations. The method may further comprise: charging the secondary cell twice, or more, and the opening and closing of the switch is repeated between a charging of the secondary cell and a next charging of the secondary cell.

According to aspects of the present invention, residual fuel remaining in the fuel cell, or between a cartridge and a membrane-electrode assembly (MEA) of the fuel cell, can be rapidly consumed. As a result, a fuel leakage can be prevented, the MEA can be prevented from being exposed to high concentration fuel under no load conditions, and the fuel can be more conveniently removed from the cartridge, when the cartridge needs to be replaced. Also, since the residual fuel is consumed by short circuiting the unit cells of the fuel cell, an additional load is not required, thereby simplifying the configuration of the fuel cell system. Since the residual fuel is consumed using repeated, short-term, short-circuits, the temperature of the fuel cell can be prevented from rising, and water stored for reuse can be prevented from evaporating.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
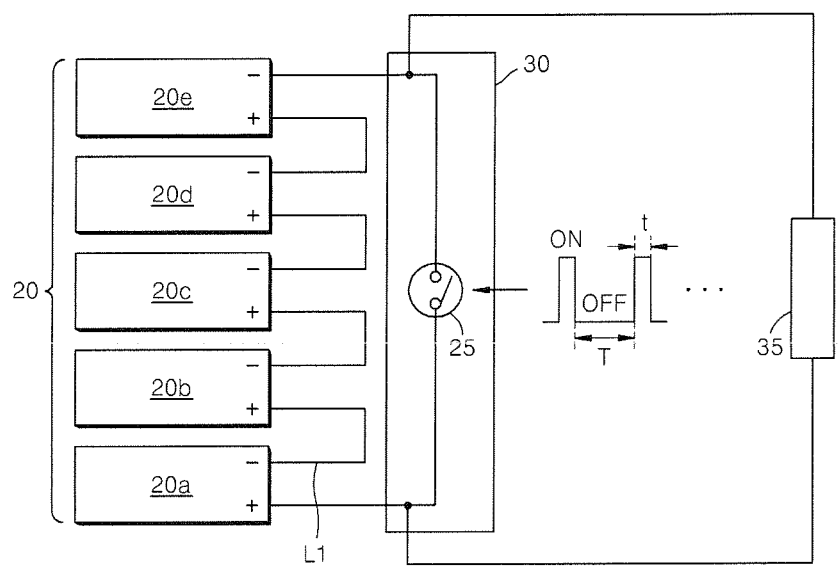
FIG. 1 is a circuit diagram illustrating a fuel cell system and a method of operating a fuel cell using the same, according to an exemplary embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures. The thicknesses of layers or regions shown in the drawings are exaggerated for clarity.

FIG. 1 is a circuit diagram illustrating a fuel cell system 100 and a method of operating a fuel cell 20 (fuel cell stack) using the same, according to an exemplary embodiment of the present invention.

Referring to FIG. 1, the fuel cell system 100 includes the fuel cell 20 (fuel cell stack) including first through fifth unit cells 20a-20e. The fuel cell 20 can be mono-polar. While the fuel cell 20 includes the five unit cells 20a-20e, in FIG. 1, the number of unit cells is not limited thereto. For example, the fuel cell 20 may include any suitable number of unit cells. A cathode of the first unit cell 20a is connected to an anode of the second unit cell 20b, via a wire L1. Similarly, a cathode of the second unit cell 20b is connected to an anode of the third unit cell 20c. In this manner, the third through fifth unit cells 20c-20e are connected in series. An anode of the first unit cell 20a and a cathode of the fifth unit cell 20e are directly connected to each other, via a switch 25.

The fuel cell 20 may have a stack structure, in which the fuel cell 20 and the switch 25 are connected in the above-described manner. The switch 25, which is to control a current flow between the first through fifth unit cells 20a-20e, is maintained in an open state while the fuel cell 20 is normally operated, for example, when supplying power to a load 35. However, when power is not supplied from the fuel cell 20 to the load 35, the operation of the fuel cell 20 is stopped, or the load 35 is removed, the switch 25 is cycled ON and OFF (closed and open) until a residual fuel remaining in membrane-electrode assemblies (MEAs) of the first-fifth unit cells 20a-20e reaches a given amount. The switch 25 may be cycled ON and OFF until a residual fuel remaining between a fuel cartridge (not shown), mounted on the fuel cell 20, is completely or substantially consumed. During the cycling of the switch 25, an OFF time T, for which the switch 25 is maintained in an OFF state, is longer than an ON time t, for which the switch 25 is maintained in an ON state (T>t). Since the first through fifth unit cells 20a-20e are short-circuited when the switch 25 is turned ON (closed), the temperature of the fuel cell system may rapidly increase. Hence, the ON time t of the switch 25 should be short enough to prevent the temperature increase from affecting the fuel cell system and/or physically damaging the MEA. However, since the ON time t is dependent on various manufacturing conditions and characteristics of the MEA, a ratio t/T may be greater than zero and less than one, according to the characteristics of the MEA. For example, the ratio of t/T may be in the range $0<(t/T)<1$, or in the range $0<(t/T)\leq 0.7$.

The operation of the switch 25 is controlled by a circuit unit 30 (control unit). The circuit unit 30 determines whether the switch 25 is in the ON state or the OFF state, by detecting whether the fuel cell 20 is operating and/or whether the fuel cell 20 is connected to the load 35. The circuit unit 30 can controls the ON and OFF times t and T of the switch 25, according to preset times. When the switch 25 is turned ON, the circuit unit 30 detects whether the temperature of the fuel cell system 100 exceeds a preset temperature. When the temperature of the fuel cell system 100 exceeds the preset temperature, due to the ON state of the switch 25, the circuit unit 30 may reduce the ON time t and increase the OFF time T, to constantly maintain the total time taken to consume the residual fuel remaining in the fuel cell 20. When the load 35 is connected to the fuel cell 20 during the ON and OFF cycling operation of the switch 25, the circuit unit 30 detects the connection of the load 35 with the fuel cell 20 and causes the switch 25 to be maintained in the opened (OFF) state.

The circuit unit 30 may include a first controller (not shown) that controls the ON and OFF operation (cycling) of the switch 25. The first controller selectively applies a pulse signal to the switch 25, so that the switch 25 can be cycled ON and OFF. The switch 25 can be maintained in the ON state when the pulse signal is applied to the switch 25 from the first controller. Alternatively, the switch 25 may be maintained in the OFF state when the pulse signal is applied to the switch 25 from the first controller. The cathode of the fifth cell 20e is connected to a first terminal of the load 35, via the circuit unit 30. The anode of the first unit cell 20a is connected to a second terminal of the load 35, via the circuit unit 30. The load 35 may be an electronic device that can use a primary or secondary cell as a power source. Examples of the load 35 include a mobile phone, a game player, an MP3 player, a personal digital assistant (PDA), a global positioning system (GPS), digital multimedia broadcasting (DMB), a camcorder, a camera, and the like.

Figure 2:
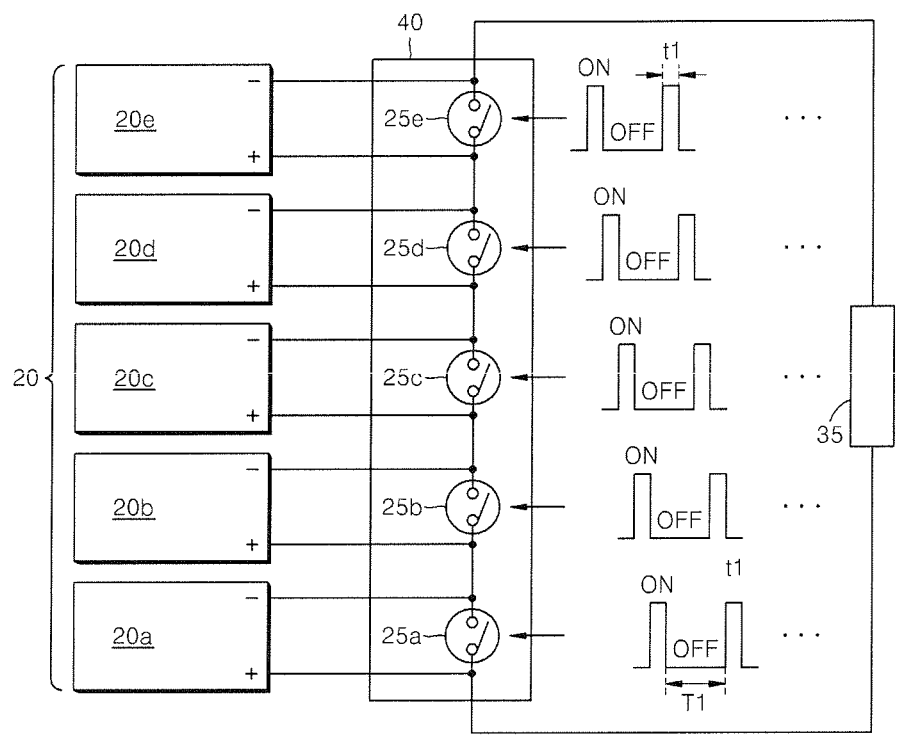
FIG. 2 is a circuit diagram illustrating a fuel cell system and a method of operating a fuel cell using the same, according to another exemplary embodiment of the present invention.

FIG. 2 is a circuit diagram illustrating a fuel cell system 200 and a method of operating a fuel cell 20 using the same, according to another exemplary embodiment of the present invention.

While the fuel cell system 100, shown in FIG. 1 is configured such that one switch 25 is connected to the fuel cell 20, the fuel cell system 200, of FIG. 2, is configured such that two or more switches may be connected to the fuel cell 20 and each switch may be connected to each of the unit cells constituting the fuel cell 20. While the fuel cell 20 of the fuel cell system 200 includes first through fifth unit cells 20a-20e, the number of unit cells is not limited thereto.

In detail, referring to FIG. 2, a cathode of the first unit cell 20a of the fuel cell 20 is connected to an anode of the second unit cell 20b, and a cathode of the second unit cell 20b is connected to an anode of the third unit cell 20c, which is adjacent to the second unit cell 20b. In this way, the third through fifth unit cells 20c-20e are connected in series. However, unlike the fuel cell system 100, the anodes and the cathodes of the respective first through fifth unit cells 20a-20e of the fuel cell system 200 are connected via first through fifth switches 25a-25e. For example; the anode and the cathode of the first unit cell 20a are connected to each other, via the first switch 25a, and the anode and the cathode of the second unit cell 20b are connected to each other, via the second switch 25b. Accordingly, when the first through fifth switches 25a-25e are turned ON, the first through fifth unit cells 20a-20e are respectively closed (short-circuited), thereby consuming the fuel remaining in the each unit cell 20a-20e. While the fuel cell 20 is normally operated to supply power to the load 35, the first through fifth switches 25a-25e are maintained in an OFF (opened) state. The first through fifth switches 25a-25e may be elements of a circuit unit 40 (control unit). Since the fuel cell system 200 includes the first-fifth switches 25a-25e, the circuit unit 40 performs the same function as the circuit unit 30 of the fuel cell system 100, except that the circuit unit 40 controls a greater number of switches.

The fuel cell system 200 includes a circuit unit 40 (control unit). The cathode of the fifth unit cell 20e and the fifth switch 25e are connected to a first terminal of the load 35, via the circuit unit 40. The anode of the first unit cell 20a and the first switch 25a are connected to a second terminal of the load 35, via the circuit unit 40.

When the load 35 is separated from the fuel cell system, or when the operation of the fuel cell 20 is stopped while the load 35 is attached to the fuel cell system, the first through fifth switches 25a-25e are switched ON and OFF in a cycling operation, to consume the residual fuel (or a portion thereof) remaining in the MEAs of the first through fifth unit cells 20a-20e and/or to consume the residual fuel remaining between the cartridge and the MEA. The cycling operation may be repeated until the residual fuel is completely consumed. Also, the cycling operation may be repeated until a voltage of each of the first through fifth unit cells 20a-20e reaches a reference voltage, for example, 0.1 V. In the present exemplary embodiment, the voltage is an open circuit voltage (OCV) measured when the first through fifth switches 25a-25e are in an opened state, during the cycling operation of the first through fifth switches 25a-25e. Since the first through fifth unit cells 20a-20e are short-circuited when the first through fifth switches 25a-25e are closed, an ON time t1, for which the first through fifth switches 25a-25e are maintained in a closed state, can be shorter than an OFF time T1, for which the first through fifth switches 25a-25e are maintained in the opened state. For example, a ratio of the ON time t1 to the OFF time T1 (t1/T1) may be greater than 0 and less than 1, according to the characteristics of the MEA, that is, in the range 0<(t1/T1)<1. The ON time t1 for which the first through fifth switches 25a-25e are maintained in the closed state may be shortened or lengthened, under the control of the circuit unit 40. For example, the time t1 may be changed by a second controller (not shown) that is included in the circuit unit 40. The second controller can controls the cycling operation of the first through fifth switches 25a-25e. The second controller of the circuit unit 40 can control the first through fifth switches 25a-25e to perform the cycling operation by applying a pulse signal to the first through fifth switches 25a-25e, like the first controller of the fuel cell system of FIG. 1. The second controller may be a single controller to control the first through fifth switches 25a-25e, or include a separate controller for each of the first through fifth switches 25a-25e, to control the switches 25a-25e individually.

The cycling operation of the first through fifth switches 25a-25e may be performed by using a number of different cycling methods. In a first cycling method, the first through fifth switches 25a-25e may be simultaneously switched ON and OFF. For example, the switches 25a-25e are all switched ON or OFF as a group, which can be referred to as a group cycle or group cycling.

In a second cycling method, the first through fifth switches 25a-25e may be independently operated in a sequence (sequential cycling). For example, the second cycling operation may be performed by turning the switches 25a-25e ON and OFF, one at a time, in a sequence, i.e., in a sequential cycle. A sequential cycle can comprise any suitable sequence, for example, a numerical sequence, a reverse numerical sequence, an arbitrary sequence, or a random sequence.

For example, when a sequential cycle comprises the reverse numerical sequence, the first through fifth switches 25a-25e are operated starting with the fifth switch 25e and proceeding in reverse numerical order to the first switch 25a, such that only a single switch is switched ON at a time. In detail, the reverse numerical sequence starts when only the fifth switch 25e is maintained in the ON state for a given time t1, while the first through fourth switches 25a-25d are maintained in the OFF state. Next, only the fourth switch 25d is maintained in the ON state for a given time t1, while the first through third switches 25a-25c and the fifth switch 25e are maintained in the OFF state. Next, only the third switch 25c is maintained in the ON state for a given time t1, while the first and second switches 25a and 25b and the fourth and fifth switches 25d and 25e are maintained in an OFF state. Next, only the second switch 25b is maintained in the ON state for a given time t1, while the first switch 25a and the third through fifth switches 25c-25e are maintained in the OFF state. Next, only the first switch 25a is maintained in the ON state for a given time t1, while the second through fifth switches 25b-25e are maintained in an OFF state, thereby completing a cycle If the residual fuel remaining in the MEAs of the first through fifth unit cells 20a-20e is not completely consumed in this process, the cycle may be repeated.

In other exemplary embodiments, the order of operation of the switches in a sequential cycle can be any order, so long as each switch 25a-25e is switched ON and OFF once per cycle. When a sequential cycle comprises the numerical sequence the switches 25a-25e may be sequentially operated starting with the first switch 25a and proceeding in numerical order to the fifth switch 25e, similar to when the sequential cycle comprises a reverse numerical sequence.

When a sequential cycle comprises the arbitrary sequence, the order in which the switches 25a-25e are switched ON and OFF can be any order, so long as only a single switch is switched ON at a time, and the order is maintained in successive cycles. When a sequential sequence comprises the random sequence, the order in which the switches 25a-25e are switched ON and OFF can vary from cycle to cycle successive cycles, so long as each switch is operated once during each of the cycles.

A third cycling method comprises dividing the switches 25a-25e into a number of groups, then sequentially cycling each group. For example, the first through fifth switches 25a-25e are divided into at least two groups, such as, a first group comprising the third through fifth switches 25c-25e, and a second group comprising the switches 25a-25b. The switches of the first group may be sequentially cycled, and at the same time the switches of the second group can be cycled using a sequential cycle. In this way a switch of the first group and a switch of the second group can be turned ON at the same time.

A fourth cycling method, according to an aspect of the present invention, comprises dividing the switches 25a-25e into first and second groups, the switches of both of the groups are then group cycled. For example, the switches of the first group are all turned ON, while the switches of the second group are all turned OFF, and then the switches of the second group are turned ON while the switches of the first group are turned OFF.

Aspects of the present invention encompass cycling methods that comprise any combination of the above-mentioned cycling methods.

Figure 3:
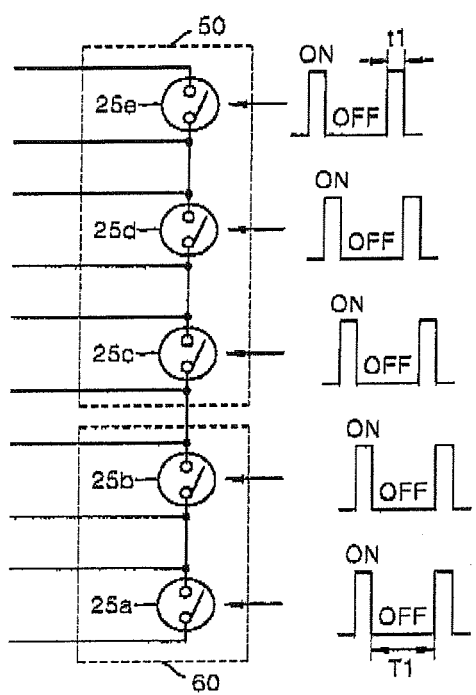
FIG. 3 is a circuit diagram illustrating another configuration of switches of the fuel cell system of FIG. 2, which are sequentially opened and closed, according to an exemplary embodiment of the present invention.

FIG. 3 is a circuit diagram illustrating another configuration of the first through fifth switches 25a-25e, which are divided into a first switch group 50 and a second switch group 60. FIG. 3 illustrates only the first through fifth switches 25a-25e and the ON and OFF times of the first through fifth switches 25a-25e, for convenience.

Referring to FIG. 3, the third through fifth switches 25c-25e, included in a first switch group 50, are sequentially cycled from the fifth switch 25e to the third switch 25c. Then, the first and second switches 25a and 25b, which are included in a second switch group 60, are both maintained in an ON state for a given time t1, i.e. are group cycled. On the contrary, the first and second switches 25a and 25b of the second switch group 60 may be sequentially cycled, and then the third through fifth switches 25c-25e of the first switch group 50 may be group cycled. The respective cycling operations of the first through fifth switches 25a-25e are repeated until a voltage of the first through fifth unit cells 20a-20e reaches the reference voltage.

The voltage can be a total voltage, which is a voltage of all of the cells 20a-20e, i.e., a voltage measured when the first through fifth switches 25a-25e are in the OFF state. When the total voltage reaches a reference voltage, a cycling operation(s) of the cells 20a-20e is stopped. For example, in the cycling operations of the first and second switch groups 50 and 60, when the total voltage reaches the reference voltage, the cycling operations of the first switch group 50 and the second switch group 60 are stopped.

The voltage of the first through fifth unit cells 20a-20e can be measured as group voltages when the switches 25a-25e are divided into switch groups. The group voltages can relate to unit cells associated with the switches of the respective switch groups. For example, a first group voltage of the first switch group 50 can be detected when the switches 25c-25e are OFF, and a second group voltage of the second switch group 60 can be detected when the switches 25a-25b are OFF. When either the first or the second group voltage reaches a reference voltage, a cycling operation applied thereto can be stopped, while a cycling operation associated with the other switch group is repeated. For example, when the first group voltage reaches a reference voltage, but the second group voltage does not reach the reference voltage, a cycling operation of the first switch group 50 is stopped, and a cycling operation of the second switch group 60 is repeated. The cycling operation of the second switch group can be stopped when the second group voltage reaches the reference voltage.

Figure 4:
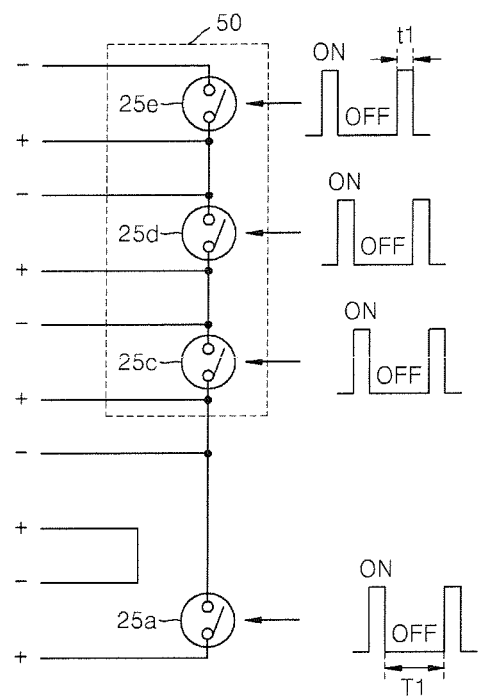
FIG. 4 is a circuit diagram illustrating another configuration of switches of the fuel cell system of FIG. 2, which are sequentially opened and closed, according to an exemplary embodiment of the present invention.

In the above described cycling operations of the first and second switch groups 50 and 60, when the first and second switches 25a and 25b of the second switch group 60 are simultaneously turned ON and OFF (group cycled), the first and second switches 25a and 25b of the second switch group 60 may be replaced with a single switch 28, as shown in FIG. 4. Similarly, when the third through fifth switches 25c-25e of the first switch group 50 are simultaneously turned ON and OFF (group cycled), the third through fifth switches 25c-25e of the first switch group 50 may be replaced with a single switch (not shown). In this regard, the number of switches provided in the fuel cell system of FIG. 2, to substantially consume the residual fuel remaining in the MEA of the fuel cell 20, or between the MEA and the cartridge, may be less than the number of unit cells of the fuel cell 20.

The first through fifth unit cells 20a-20e generate a maximum current when the voltage per cell reaches an ideal operation point, where the potentials of the anodes and the cathodes of the respective first through fifth unit cells 20a-20e are equal to each other. A larger current generation results in a larger fuel consumption. Hence, in the cycling operations of the switches 25 and 25a-25e of the fuel cell system of any of FIGS. 1 and 2, the switches 25 and 25a-25e may be short-circuited, so that the anodes and cathodes of the respective first through fifth unit cells 20a-20e can have a lower resistance, thereby enabling the voltage per cell to reach the ideal operating point.

Figure 5:
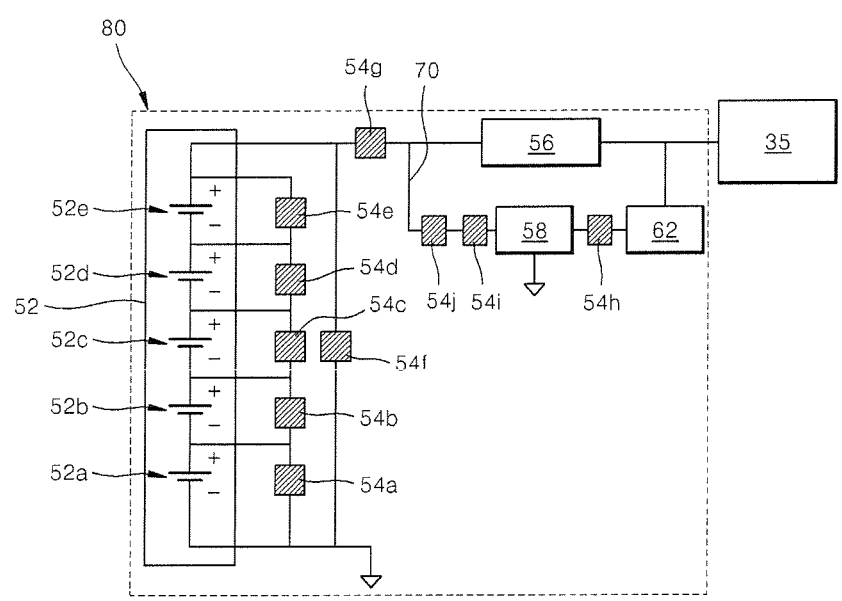
FIG. 5 is a block diagram of a fuel cell system, according to another exemplary embodiment of the present invention.

FIG. 5 is a circuit diagram of a fuel cell system 80 according to another embodiment of the present invention.

Referring to FIG. 5, the fuel cell system 80 includes a fuel cell 52 (fuel cell stack) including first through fifth unit cells 52a-52e, first through tenth switches 54a-54j, a DC-DC converter 56 (referred to as a converter hereinafter), a secondary cell 58, and a battery charger 62. While the fuel cell 52 includes the five unit cells 52a-52e in FIG. 5, the present teachings are not limited thereto. Thus, the fuel cell 52 may include six or more unit cells, or four or fewer unit cells. The unit cells 52a-52e may be the same as the unit cells 20a-20e of FIG. 2.

The first through fifth switches 54a-54e may perform the same function as the switches 25a-25e of FIG. 2, and the sixth switch 54f may perform the same function as the switch 25 of FIG. 1. The first through fifth switches 54a-54e are connected in parallel to the unit cells 52a-52e, respectively, and the sixth switch 54f is connected in parallel to both ends of the fuel cell 52. When the sixth switch 54f is used, the first through fifth switches 54a-54e are maintained in an opened state, namely, in an OFF state. The converter 56 converts a power level produced by the fuel cell 52 into a power level that is required by a load 35. The seventh switch 54g is disposed between the converter 56 and the fuel cell 52. The seventh switch 54g may be used to separate the converter 56 and the second cell 58, from the fuel cell 52, when the fuel cell 52 is abnormally operated or other electrical problems occur. When the seventh switch 54g is in a closed state, namely, in an ON state, a current generated by the fuel cell 52 may flow to the converter 56. However, when the seventh switch 54g is in an OFF state, the current generated by the fuel cell 52 is cut OFF, and thus, cannot flow to the converter 56. A first end of the sixth switch 54f is connected to a line, which connects the fuel cell 52 to the seventh switch 54g. The first through seventh switches 54a-54g may be field effect transistors having low ON-state resistances, or mechanical or electronic switches having low ON-state resistances.

When a power required by the load 35 is greater than power supplied by the fuel cell 52, the secondary cell 58 supplies a power corresponding a difference therebetween, to the load 35. Accordingly, when the power required by the load 35 is sufficiently supplied by the fuel cell 52, the secondary cell 58 may be in a standby state. An input end of the secondary cell 58 is connected to an output end of the battery charger 62. An output end of the secondary cell 58 is connected to an input end of the converter 56. The ninth and tenth switches 54i and 54j are disposed on a wire 70 connecting the output end of the secondary cell 58 and the input end of the converter 56. The ninth and tenth switches 54i and 54j cut off or pass a current flowing from the secondary cell 58 to the converter 56, according to a signal of a control unit (not shown). The seventh through tenth switches 54g-54j may be power metal oxide field effect transistors. When the secondary cell 58 is operated to supply power to the load 35, the ninth and tenth switches 54i and 54j are in an ON state. However, while the secondary cell 58 is charged by the battery charger 62, the ninth and tenth switches 54i and 54j are in an OFF state.

A method of operating the fuel cell 52 of the fuel cell system of FIG. 5, to substantially consume a residual fuel will now be explained. The residual fuel in the fuel cell 52 may be consumed in two methods.

A first method is performed by fully charging the secondary cell 58, and when there is still a residual fuel, cycling ON and OFF the first through fifth switches 54a-54e, or the sixth switch 54f. The first through fifth switches 54a-54e may be cycled ON and OFF in the same manner as described in the case of the first through fifth switches 25a-25e of FIGS. 2 and 3. The sixth switch 54f may be cycled ON and OFF in the same manner as described in the case of the switch 25 of FIG. 1.

Figure 6:
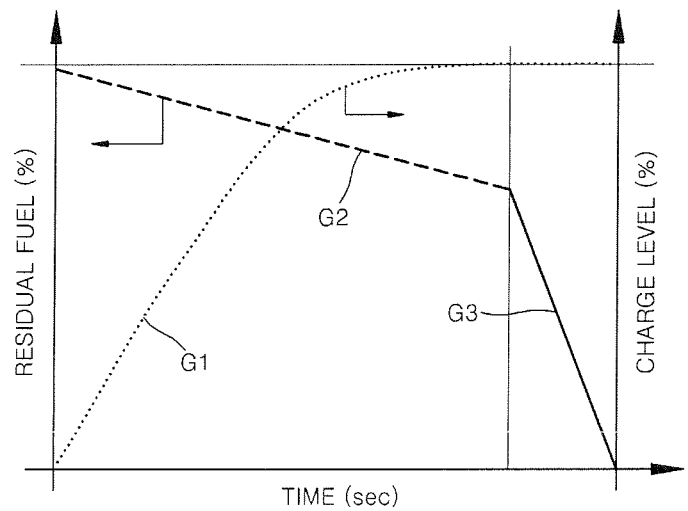
FIG. 6 includes graphs illustrating aspects of a method of operating a fuel cell of the fuel cell system of FIG. 5, to consume residual fuel remaining in the fuel cell, according to an exemplary embodiment of the present invention.

FIG. 6 includes graphs illustrating aspects of the first method. In FIG. 6, a first graph G1 represents a charge level of the secondary cell 58 when using the residual fuel, a second graph G2 represents a reduction in the residual fuel when the secondary cell 58 is charged, and a third graph G3 represents a reduction in the residual fuel when the secondary cell 58 is charged and then the first through fifth switches 54a-54e or the sixth switch 54f are periodically or non-periodically cycled ON and OFF, that is, the unit cells 52a-52e of the fuel cell 52 are periodically or non-periodically short-circuited. In other words the unit cells 52a-52e can be short circuited once or multiple times.

Referring to FIG. 6, the residual fuel is gradually reduced while the secondary cell 58 is charged. Once the secondary cell 58 is fully charged, the residual fuel is drastically reduced when the unit cells 52a-52e of the fuel cell 52 are periodically or non-periodically short-circuited.

A second method of operating the fuel cell 52 of the fuel cell system 80 of FIG. 5, to consume the residual fuel, is performed by alternately repeating the charging of the secondary cell 58 and the short-circuiting of the unit cells 52a-52e. In this case, the short-circuiting of the unit cells 52a-52e may be repeated periodically or non-periodically. Also, the unit cells 52a-52e may be short-circuited simultaneously or sequentially.

Figure 7:
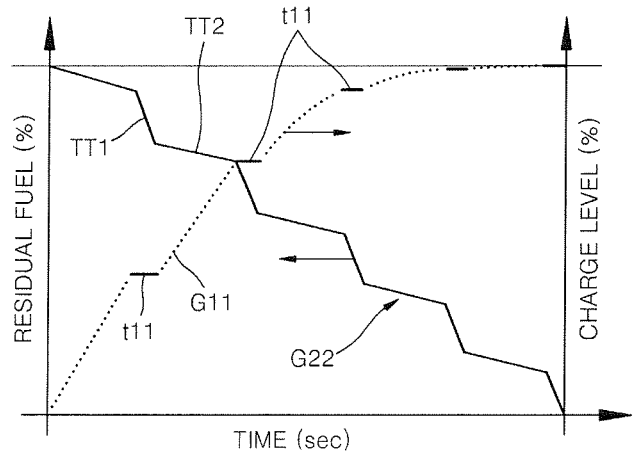
FIG. 7 includes graphs illustrating aspects of a method of operating the fuel cell of the fuel cell system of FIG. 5, to consume the residual fuel remaining in the fuel cell, according to another exemplary embodiment of the present invention.

FIG. 7 includes graphs illustrating aspects of the second method. In FIG. 7, a first graph G11 represents a charge level of the secondary cell 58, when residual fuel is consumed, and a second graph G22 represents a reduction in the residual fuel, when the periodical charging of the secondary cell 58 and the periodical short-circuiting of the unit cells 52a-52e in the fuel cell 52 are alternately repeated. A first time interval t11 shown in the first graph G11 is a time interval in which the charging of the secondary cell 58 is stopped and the unit cells 52a-54e in the fuel cell 52 are short-circuited. The second graph G22 includes a first time interval TT1 and a second time interval TT2 which are alternately repeated. The second time interval TT2 is longer than the first time interval TT1. The second time interval TT2 is a time interval in which the residual fuel is consumed, due to the charging of the secondary cell 58. The first time interval TT1 is a time interval in which the residual fuel is consumed, due to the short-circuiting of the unit cells 52a-52e. Accordingly, the first time interval TT1 of the second graph G22 is equal to the first time interval t11, of the first graph G11. Also, a time interval, in which the secondary cell 58 is charged, between the first time intervals t11 of the first graph G11, is equal to the second time interval TT2 of the second graph G22.

Referring to the second graph G22 of FIG. 7, the reduction in the residual fuel, due to the short-circuiting of the unit cells 52a-52e, is more rapid than the reduction in the residual fuel, due to the charging of the secondary cell 58.

Figure 8:
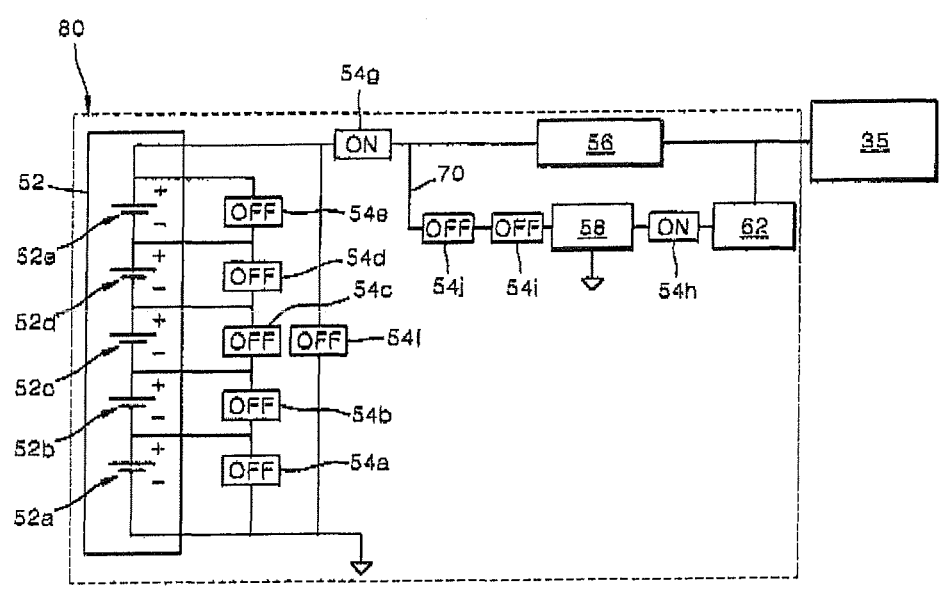
FIG. 8 is a circuit diagram illustrating states of elements of the fuel cell system of FIG. 5 when the residual fuel is consumed, by charging a secondary cell in the methods of FIGS. 6 and 7.

FIG. 8 is a block diagram illustrating states of elements of the fuel cell system of FIG. 5, when the residual fuel of the fuel cell 52 is consumed by charging the secondary cell 58 in the first and second methods.

Referring to FIG. 8, the first through sixth switches 54a-54f and the ninth and tenth switches 54i and 54j are in an OFF state. The seventh and eighth switches 54g and 54h are in an ON state. The load 35 and the fuel cell system 80 are regarded as being in an OFF state. Accordingly, power produced by residual fuel of the fuel cell 52 may flow through the converter 56 and the charger 62 and may be used to charge the secondary cell 58. The charger 62 may comprise a converter, and the power from the fuel cell 52 can be routed directly to the charger 62.

The charging of the secondary cell 58 in the first method may be continued without interruption, until the voltage of the fuel cell 52 drops below a predetermined value. However, the charging of the secondary cell 58 in the second method may not be completed at one time, and if so, may be periodically or non-periodically repeated until the voltage of the fuel cell 52 drops below the predetermined value. The residual fuel is consumed by short-circuiting the unit cells 52a-52e of the fuel cell 52 between a charging of the secondary cell 58 and a next charging of the secondary cell 58.

The first and second methods consume the residual fuel of the fuel cell 52 by simultaneously short-circuiting the unit cells 52a-52e in the fuel cell 52, or arbitrarily or sequentially short-circuiting one or more of the unit cells 52a-52e in the fuel cell 52, that is, by turning ON and OFF the first through fifth switches 52a-52e or the sixth switch 52f, according to any cycling methods a described therein. When the residual fuel of the fuel cell 52 is consumed by turning ON and OFF the first through fifth switches 52a-52e or the sixth switch 52f, the seventh switch 54g is maintained in an OFF state.

As described above, the fuel cell system, according to aspects of the present invention, employs one or more switches between the fuel cell and the load, as means for short-circuiting the whole fuel cell, or selectively short-circuiting the unit cells. The fuel cell system, according to aspects of the present invention, also employs a circuit unit to control the operation of the switch.

Since the fuel cell system repeatedly performs the ON and OFF operation (cycling operation) on one or more of the switches, in such a manner that the ON time (short-circuit time) is shorter than the OFF time, the residual fuel remaining in the fuel cell or between the cartridge and the MEA of the fuel cell can be safely and rapidly consumed, while controlling a temperature increase of the fuel cell system.

As a result, fuel leakage can be prevented, the MEA can be prevented from being exposed to highly concentrated fuel under no load, and the residual fuel remaining in the cartridge can be removed when the cartridge needs to be replaced with a new one. Also, since the fuel is consumed due to the short circuiting of the unit cells included in the fuel cell, the configuration of the fuel cell system can be simplified. Since the residual fuel can be consumed by repeating the short circuiting, the temperature of the fuel cell can be prevented from rising, and water that is stored for reuse can be prevented from evaporating.

While the present invention has been particularly shown and described with reference to exemplary embodiments thereof, it will be understood by one of ordinary skill in the art that various changes in form and details may be made therein without departing from the spirit and scope of the present invention. For example, various switches, for example transistors, or any other suitable switching devices, may be used as switches 25, 25a-25e, and 28. Also, instead of turning ON a switch during a short time for a plurality of times in order to consume the residual fuel the OFF time may be increased. That is, the OFF time may vary according to a time lapse. Also, the switch controller may be installed outside the circuit unit. Accordingly, the spirit and scope of the present invention is not defined by the embodiments explained above but by the following claims.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of operating a fuel cell system to supply power to a load, the fuel cell system including a fuel cell stack including unit cells, and switches to selectively complete short circuits connected to the unit cells, the method comprising:
    performing a cycle to short circuit each of the unit cells when the load is not connected to the fuel cell stack, the cycle comprising selectively closing each of the switches for a first time (t), such that each of the switches selectively completes a short circuit of less than all of the unit cells, and opening each of the switches for a second time (T), at least two of the switches being closed at different times and the closing and opening of each of the switches being performed in a predetermined sequence; and
    repeating the performing of the cycle, such that the predetermined sequence is repeated in each cycle, until a residual fuel in the fuel cell stack is consumed,
    wherein the first time (t) is shorter than the second time (T), and the repeating of the performing includes adjusting the first time (t) and the second time (T) according to a temperature of the fuel cell stack.

2. The method of claim 1, wherein the unit cells are connected in series.

3. The method of claim 1, wherein the first end of one of the short circuits is connected to an anode of a first one of the unit cells, and the second end of the one of the short circuits is connected to a cathode of a second one of the unit cells.

4. The method of claim 1, wherein the repeating of the performing of the cycle includes shortening the second time (T) of one of the repeated cycles.

5. The method of claim 1, wherein the repeating of the performing of the cycle includes measuring the voltage of each of the unit cells when a respective one of the switches is opened.

6. The method of claim 5, wherein the repeating of the performing of the cycle continues until the measured voltage reaches a reference voltage and the residual fuel in the fuel cell stack is consumed.

7. The method of claim 1, wherein a ratio of the first time (t) to the second time (T) is $0<t/T\leq0.7$.

8. A method of operating a fuel cell system to supply power to a load, the fuel cell system including a fuel cell stack including unit cells, short circuits connected to each of the unit cells, switches to selectively open and close each of the short circuits, a converter connected to the fuel cell stack, a secondary cell connected to the fuel cell stack, a battery charger connected to the secondary cell and the fuel cell stack, and a switching unit between the load and the fuel cell, the method comprising:

charging the secondary cell;

performing a cycle to short circuit each of the unit cells when the load is not connected to the fuel cell stack or when the load is stopped in operation, the cycle including selectively closing each of the switches for a first time (t), such that each of the switches selectively completes a short circuit of less than all of the unit cells, and opening each of the switches for a second time (T), at least two of the switches being closed at different times and the closing and opening of each of the switches being performed in a predetermined sequence; and repeating the performing of the cycle, such that the predetermined sequence is repeated in each cycle, until a residual fuel in the fuel cell stack is consumed, wherein the first time (t) is shorter than the second time (T).

9. The method of claim 8, further comprising charging the secondary cell after the repeating of the performing of the cycle.

10. The method of claim 8, wherein the secondary cell is fully charged, before the performing of the cycle.

11. The method of claim 8, wherein the performing of the cycle includes having only one of the switches be closed at a time.

12. The method of claim 8, wherein the performing of the cycle includes:

dividing the switches into groups; and opening and closing the switches of each of the groups in respective cycles.

13. The method of claim 12, wherein in the respective cycles only one of the switches of each of the groups is kept closed at any particular time.

14. The method of claim 8, wherein the repeating of the performing includes adjusting the first time (t) and the second time (T) according to a temperature of the fuel cell stack, and until the residual fuel in the fuel cell stack is consumed.

15. A method of operating a fuel cell system to supply power to a load, the fuel cell system including a fuel cell stack including unit cells, short circuits connected to each of the unit cells, and switches to selectively open and close each of the short circuits, the method comprising:

performing a cycle to short circuit each of the unit cells when the load is not connected to the fuel cell stack or when the load is stopped in operation, the cycle including selectively closing each of the switches for a first time (t), such that each of the switches selectively completes a short circuit of less than all of the unit cells, and opening each of the switches for a second time (T), at least two of the switches being closed at different times and the closing and opening of each of the switches being performed in a predetermined sequence; and repeating the performing of the cycle, such that the predetermined sequence is repeated in each cycle, until a residual fuel in the fuel cell stack is consumed, wherein the first time (t) is shorter than the second time (T).

16. The method of claim 15, wherein the performing of the cycle includes having only one of the switches be closed at any one time.

17. The method of claim 15, wherein the repeating of the performing of the cycle includes performing a number of cycles that is determined by detecting a voltage for each of the unit cells, measured when a respective one of the switches is opened, and until the residual fuel in the fuel cell stack is consumed.

18. The method of claim 15, further comprising detecting that the load is not connected to the fuel cell stack before performing the cycle.

19. The method of claim 15, wherein the performing of the cycle includes closing at least two of the switches at a time.

20. The method of claim 15, wherein the performing of the cycle includes dividing the switches into groups, and having only one of the switches from each of the groups be closed at a time.

21. The method of claim 15, wherein the performing of the cycle includes dividing the switches into first and second groups, closing all the switches of the first group at the same time, and having only one switch of the second group be closed at a time.

22. The method of claim 15, further comprising stopping a supply of fuel to the fuel cell stack before the performing of the cycle.

23. The method of claim 15, wherein a ratio of the first time (t) to the second time (T) is $0<t/T\leq0.7$.

24. The method of claim 15, wherein the repeating of the performing includes adjusting the first time (t) and the second time (T) according to a temperature of the fuel cell stack, and until the residual fuel in the fuel cell stack is consumed.

* * * * *